(12) United States Patent
Nakazawa

(10) Patent No.: US 12,044,843 B2
(45) Date of Patent: Jul. 23, 2024

(54) LIGHT GUIDE DEVICE

(71) Applicant: KAWASAKI JUKOGYO KABUSHIKI KAISHA, Kobe (JP)

(72) Inventor: Mutsuhiro Nakazawa, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 499 days.

(21) Appl. No.: 17/593,016

(22) PCT Filed: Mar. 4, 2020

(86) PCT No.: PCT/JP2020/009047
§ 371 (c)(1),
(2) Date: Sep. 3, 2021

(87) PCT Pub. No.: WO2020/179808
PCT Pub. Date: Sep. 10, 2020

(65) Prior Publication Data
US 2022/0179199 A1 Jun. 9, 2022

(30) Foreign Application Priority Data

Mar. 6, 2019 (JP) .................................. 2019-040934

(51) Int. Cl.
*G02B 26/08* (2006.01)
*B23K 26/082* (2014.01)
*G02B 26/10* (2006.01)

(52) U.S. Cl.
CPC .......... *G02B 26/105* (2013.01); *B23K 26/082* (2015.10); *G02B 26/0816* (2013.01)

(58) Field of Classification Search
CPC G02B 26/105; G02B 26/0816; G02B 7/1821; G02B 26/12; G02B 27/0977; G02B 27/0933; G02B 5/08; B23K 26/082
See application file for complete search history.

(56) References Cited

U.S. PATENT DOCUMENTS 7,729,029 B2 *  6/2010  Broome ................... G02B 5/09
                                                        359/201.2
2008/0273231 A1  11/2008  Broome
(Continued)

FOREIGN PATENT DOCUMENTS

CN    107335924    11/2017
JP    1-280719     11/1989
(Continued)

*Primary Examiner* — Euncha P Cherry
(74) *Attorney, Agent, or Firm* — Fay Kaplun & Marcin, LLP

(57) ABSTRACT

A light guide device includes reflection units that reflect incident light so as to guide it to irradiate on an object. The units are lined up along a traveling direction of the incident light. Each of the units includes a first light guide member that reflects the incident light. Each of the units is switched between a reflecting state in which the first member reflects the incident light and a passing state in which the incident light passes through, by rotation of the first member. Timing of being in the reflecting state differs among the units. In the reflecting state, the reflected light due to reflection of the incident light is deflected as the first member rotates. The reflected light is led to an irradiated point included in a scanning area in which the unit scans the object to be irradiated. The scanning areas of the units are lined up in parallel with the traveling direction of the incident light.

11 Claims, 8 Drawing Sheets

(56) References Cited

U.S. PATENT DOCUMENTS

| | | | |
|---|---|---|---|
| 2014/0036331 A1* | 2/2014 | Kuge | G02B 26/10 359/216.1 |
| 2016/0077341 A1 | 3/2016 | Takagi et al. | |

FOREIGN PATENT DOCUMENTS

| | | |
|---|---|---|
| JP | 6-181354 A | 6/1994 |
| JP | 2010197497 | 9/2010 |
| JP | 2013-171144 A | 9/2013 |
| JP | 2015-210437 | 11/2015 |
| JP | 2016-206245 A | 12/2016 |

\* cited by examiner

LIGHT GUIDE DEVICE

PRIORITY DATA

The present application is a 371 application of PCT Patent Application Serial No. PCT/JP2020/009047 filed on Mar. 4, 2020; which claims priority to Japanese Patent Application Serial No. 2019-040934 filed on Mar. 6, 2019. The disclosure of the above applications is incorporated herein by reference.

TECHNICAL FIELD

The present invention relates to a light guide device.

BACKGROUND ART

Conventionally, a technique for scanning light from a light source along a straight scanning line has been widely used in image forming devices, laser processing devices, and the like. PTL 1 discloses a beam scanning device provided in this type of apparatus.

The beam scanning device of PTL 1 is provided with a rotating polyhedral mirror, a plurality of scanning units, a beam switching member, and a beam switching control unit. A beam from a light source device is incident on the beam switching member. The beam switching control unit is configured to control the beam switching member so that deflection of the beam by the rotating polyhedral mirror of the scanning unit is repeated for each reflection surface of the rotating polyhedral mirror, and to cause each of the plurality of the scanning units to perform one-dimensional scanning of the spot light (beam) in turn.

PRIOR-ART DOCUMENTS

Patent Documents

PTL 1: Japanese published unexamined patent application No. 2016-206245

SUMMARY OF THE INVENTION

In the configuration of PTL 1 above, the beam switching member is electrically controlled by the beam switching control unit to switch the light path of the beam so that the beam from the light source device is incident on one scanning unit. Accordingly, the structure for switching the light path of the beam is complicated, and there is room for improvement in this respect.

The present invention relates to a light guide device capable of switching a scanning area with a simple structure.

Means for Solving the Problems

The problem to be solved by the present invention is as described above, and the means for solving the problem and the effect thereof are described below.

According to an aspect of the present invention, a light guide device having the following configuration is provided. That is, the light guide device includes a plurality of reflection units that reflect incident light so as to guide the incident light to irradiate an object. The plurality of the reflection units are lined up along a traveling direction of the incident light. Each of the plurality of the reflection units includes a first light guide member that reflects the incident light. Each of the plurality of the reflection units is switched between a reflecting state in which the first light guide member reflects the incident light by being hit by the incident light and a passing state in which the first light guide member lets the incident light pass through without being hit by the incident light by rotating the first light guide member. Timing of being in the reflecting state differs among the plurality of the reflection units. In the reflecting state, the reflected light due to reflection of the incident light is deflected as the first light guide member rotates. The reflected light is led to an irradiated point included in a scanning area in which the reflection unit scans the object to be irradiated. The scanning areas of the plurality of the reflection units are lined up in parallel with the traveling direction of the incident light.

As a result, by rotating the first light guide member in each of the plurality of the reflection units, the reflection unit that reflects the incident light can be mechanically changed to switch the scanning area to the irradiated object. Accordingly, the switching of the scanning area can be performed with a simple configuration.

DETAILED DESCRIPTION

Figure 1:
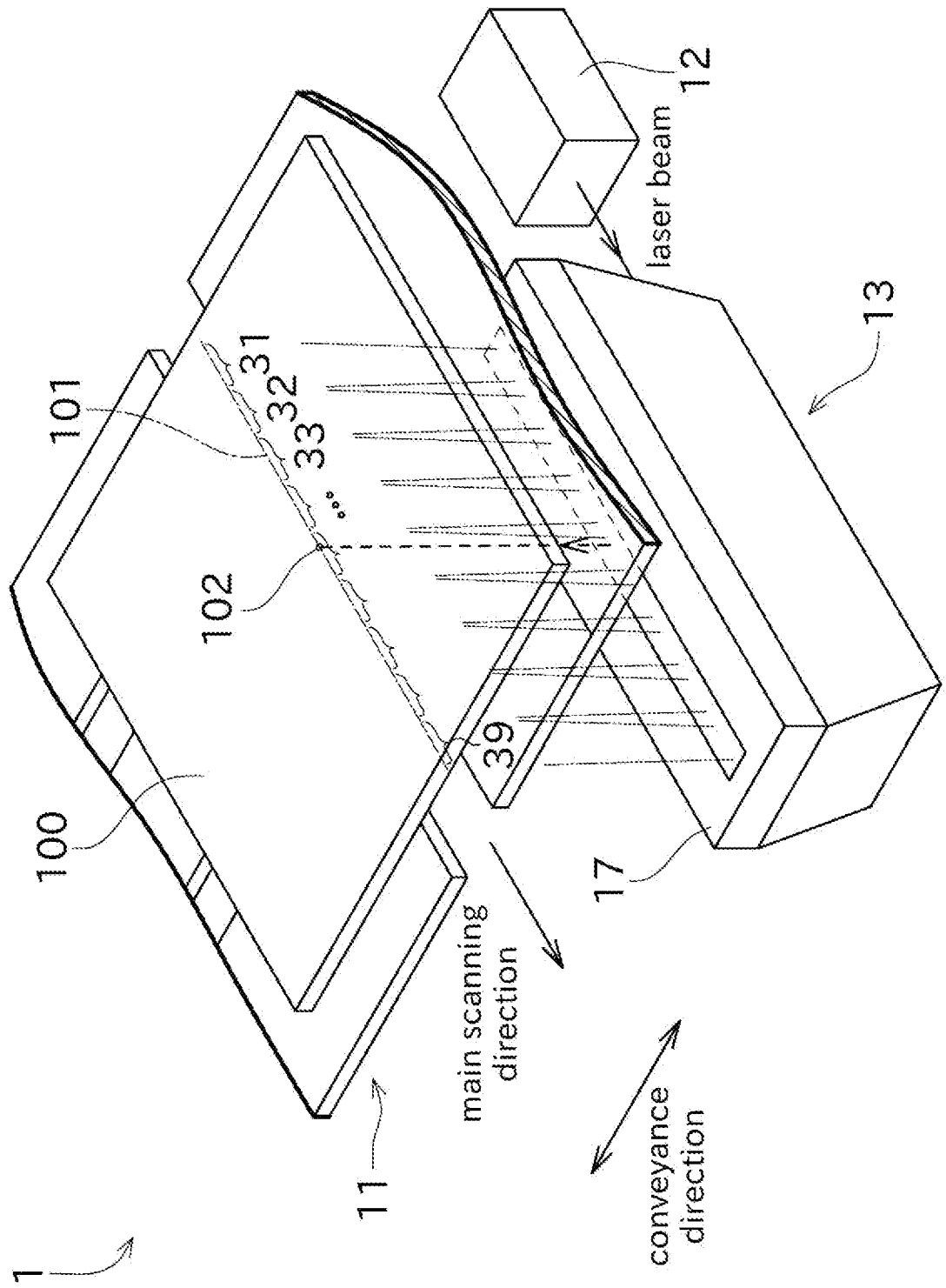
FIG. 1 is a diagonal view of a laser processing device equipped with a light guide device according to one embodiment of the present invention.

Next, an embodiment of the present invention will be described with reference to the drawings. Initially, referring to FIG. 1, a configuration of a laser processing device (optical scanning device) 1 equipped with a light guide device 13 according to one embodiment of the present invention will be described. FIG. 1 is a diagonal view of the laser processing device 1.

The laser processing device 1 shown in FIG. 1 can process the workpiece 100 by irradiating a laser beam onto the workpiece (irradiated object) 100 while scanning the workpiece 100 by light.

In the present embodiment, the laser processing device 1 can perform non-thermal processing. For example, the non-thermal processing includes ablation processing. The ablation processing is a processing in which a part of the workpiece 100 is vaporized by irradiating the laser beam to the part of the workpiece 100. The laser processing device 1 may be configured to perform thermal processing in which the workpiece 100 is melted by the heat of the laser beam.

The workpiece 100 is a plate-like member. The workpiece 100 is made of, for example, CFRP (carbon fiber reinforced plastic). The workpiece 100 is not limited to a plate-like member and may be, for example, a block-like member. Also, the workpiece 100 may be made of other materials.

The laser beam used in the laser processing device 1 may be visible light or electromagnetic waves in a wavelength band other than visible light. In this embodiment, not only visible light but also various electromagnetic waves with a wider wavelength band than that are included are referred to as "light".

As shown in FIG. 1, the laser processing device 1 includes a conveyance section 11, a laser generator 12, a light guide device 13.

The conveyance section 11 can move the workpiece 100 in a direction that is substantially perpendicular to the main scanning direction of the laser processing device 1. Laser processing is performed while the workpiece 100 is moved by the conveyance section 11.

In this embodiment, the conveyance section 11 is a belt conveyor. The conveyance section 11 is not particularly limited. The conveyance section 11 may be a roller conveyor, or may be a configuration in which the workpiece 100 is grasped and conveyed. Also, the conveyance section 11 can be omitted and processing can be performed by irradiating the laser beam to the workpiece 100 which is fixed so as not to move.

The laser generator 12 is a light source of the laser beam and can generate a pulsed laser with a short time width by pulse oscillation. The time width of the pulsed laser is not particularly limited. The time width is a short time interval such as a nanosecond order, a picosecond order, or a femtosecond order, for example. The laser generator 12 may be configured to generate a CW laser by continuous wave oscillation.

The light guide device 13 guides the laser beam generated by the laser generator 12 to irradiate the workpiece 100. The laser beam guided by the light guide device 13 is irradiated to an irradiated point 102 on a scanning line 101 defined on the surface of the workpiece 100. As will be described in detail below, the light guide device 13 causes the irradiated point 102, to which the workpiece 100 is irradiated by the laser beam, to move at a substantially constant speed along the straight scanning line 101. In this way, the light scanning is realized.

Figure 2:
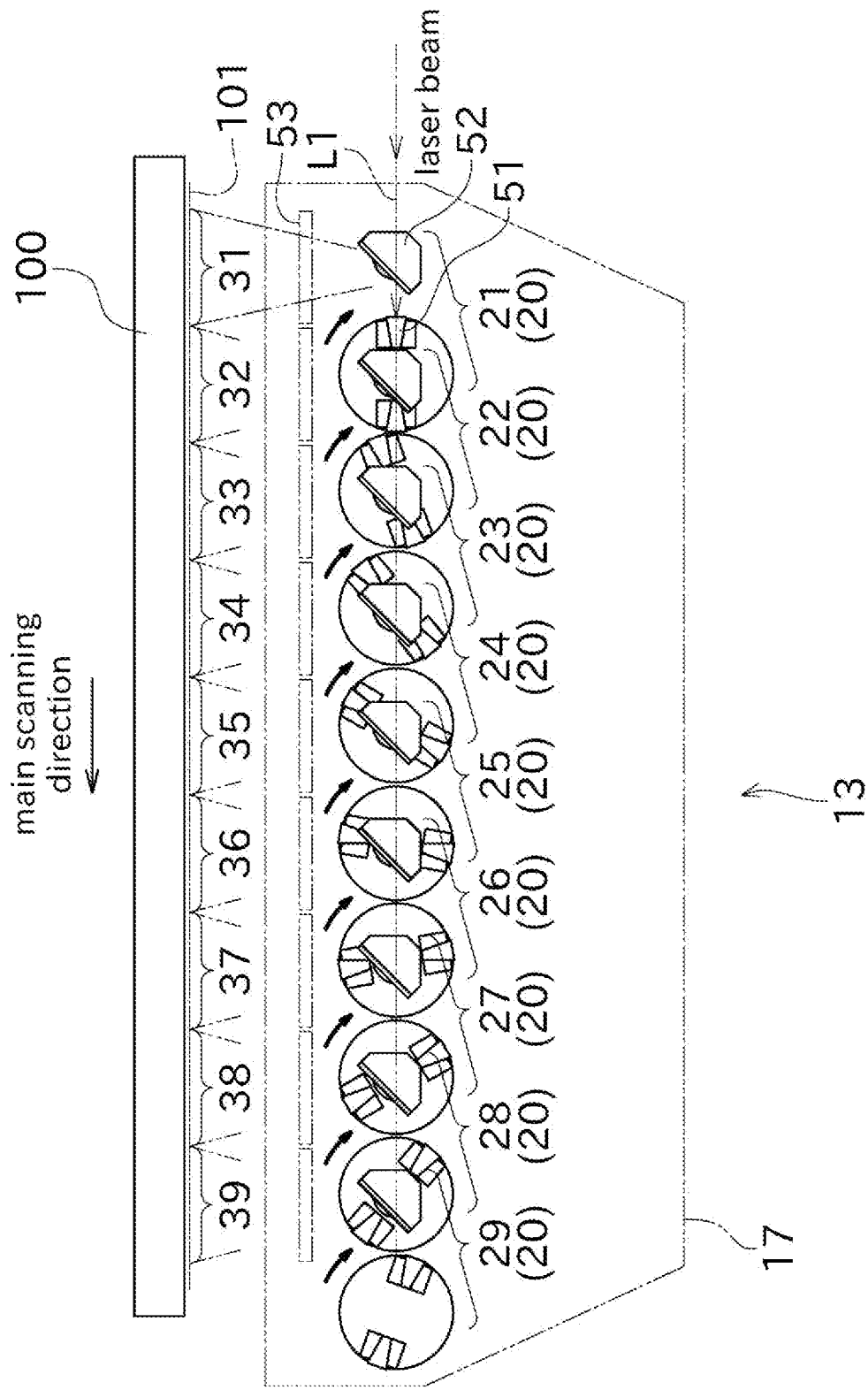
FIG. 2 is a schematic diagram showing a configuration of the light guide device.

Next, referring to FIG. 2, the light guide device 13 will be described in detail. FIG. 2 is a schematic diagram of the light guide device 13.

As shown in FIG. 2, the light guide device 13 includes a plurality of reflection units 20. In this embodiment, the plurality of the reflection units 20 are disposed inside a housing 17 provided by the light guide device 13.

The plurality of the reflection units 20 each reflect the laser beam incident from the laser generator 12 and guide it to the workpiece 100. In the following, the laser beam incident from the laser generator 12 to the respective reflection units 20 may be referred to as the incident light. The plurality of the reflection units 20 are lined up straight along the traveling direction of the incident light. The direction in which the reflection units 20 are lined up also matches the longitudinal direction of the scanning line 101. Each of the plurality of the reflection units 20 is disposed at a position where the distance from the scanning line 101 is substantially equal.

Hereafter, with respect to the plurality of the reflection units 20, the reflection unit 20 located at the most upstream side in the traveling direction of the incident light may be referred to as a first reflection unit 21. In addition, each of the remaining reflection units 20 may be referred to as a second reflection unit 22, a third reflection unit 23, a fourth reflection unit 24, a fifth reflection unit 25, a sixth reflection unit 26, a seventh reflection unit 27, an eighth reflection unit 28, and a ninth reflection unit 29, in order from the first reflection unit 21 to the downstream side in the traveling direction of the incident light.

Each of the reflection units 20 can scan optically by deflecting and reflecting the laser beam. The area in which the workpiece 100 is optically scanned by each of the reflection units 20 (scanning area) is different from the scanning area by the other reflection units 20. FIG. 1 and FIG. 2 show a first scanning area 31, a second scanning area 32, a third scanning area 33, a fourth scanning area 34, a fifth scanning area 35, a sixth scanning area 36, a seventh scanning area 37, an eighth scanning area 38, and a ninth scanning area 39. The nine scanning areas are arranged in a straight arrangement. A set of these scanning areas constitutes a scanning line 101.

The first scanning area 31 is scanned by the first reflection unit 21, and thereafter each scanning area is sequentially scanned by the corresponding reflection unit 20. The ninth scanning area 39 is scanned by the ninth reflection unit 29.

Each of the reflection units 20 can iteratively switch between a reflecting state, in which it reflects the incident light and performs scanning, and a passing state, in which it does not reflect the incident light and passes it downstream. When the reflection unit 20 is in the reflecting state, the corresponding scanning area (e.g., the first scanning area 31 in the case of the first reflection unit 21) is scanned by light. When the reflection unit 20 is in the passing state, the corresponding reflection unit 20 does not perform the light scanning.

Timing at which each of the reflection units 20 is in the reflecting state differs among the plurality of the reflection units 20. As a result, the plurality of the scanning areas are scanned respectively by switching the reflection units 20 that enter the reflecting state.

In the present embodiment, the reflection units 20 that enter the reflecting state are switched one by one in order from the upstream side to the downstream side in the traveling direction of the incident light. Specifically, the reflection units 20 enter the reflecting state in the order of the first reflection unit 21, the second reflection unit 22, the third reflection unit 23, . . . . However, the reflection units 20 may be switched to the reflecting state in order from the downstream side, or in an order different from the order in which the reflection units 20 are lined up.

Figure 3:
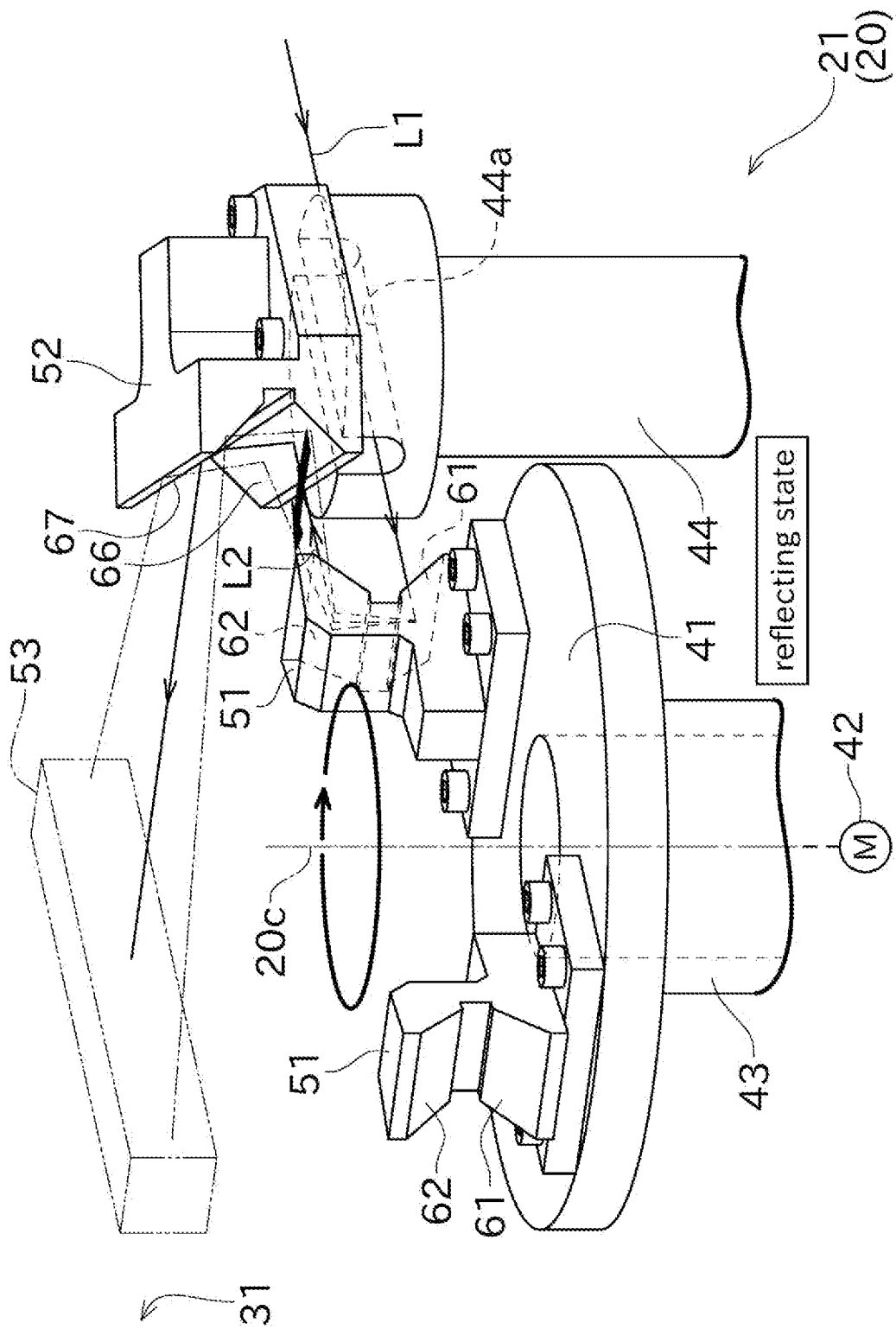
FIG. 3 is a diagonal view showing a state in which one reflection unit reflects light.
Figure 4:
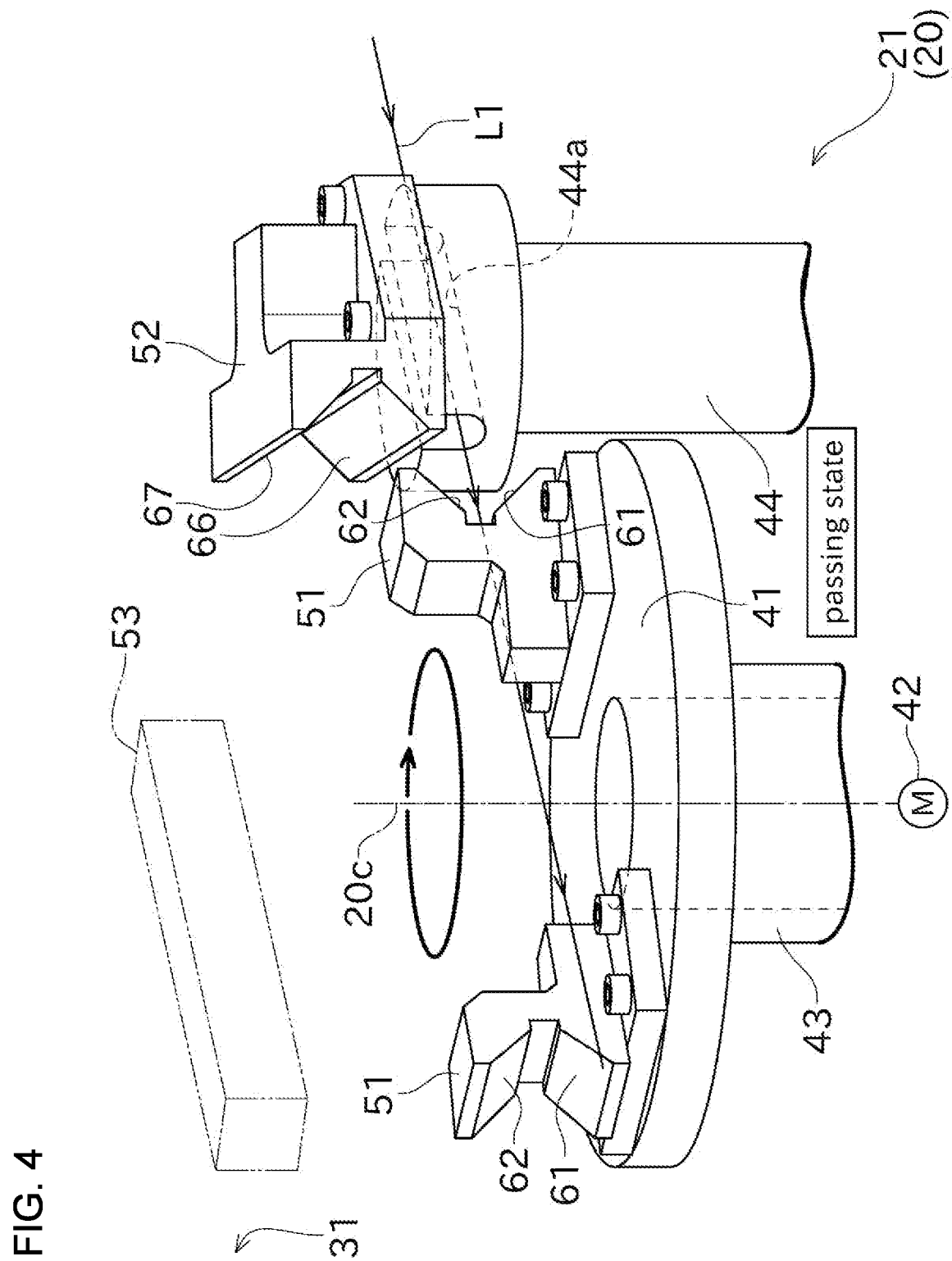
FIG. 4 is a diagonal view showing a state in which the reflection unit passes through the light.
Figure 5:
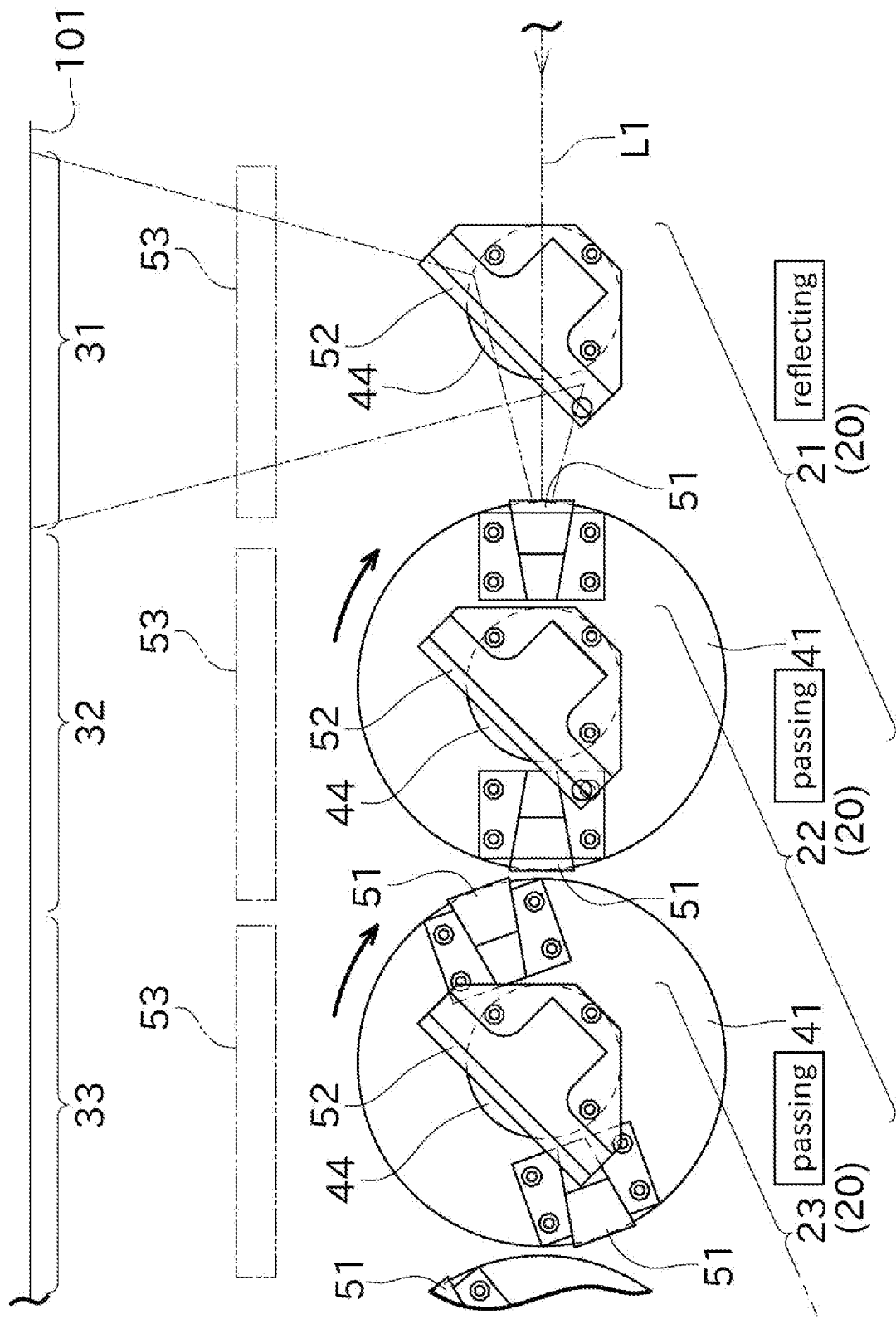
FIG. 5 is a view showing a state in which a first reflection unit of the plurality of the reflection units reflects light.
Figure 6:
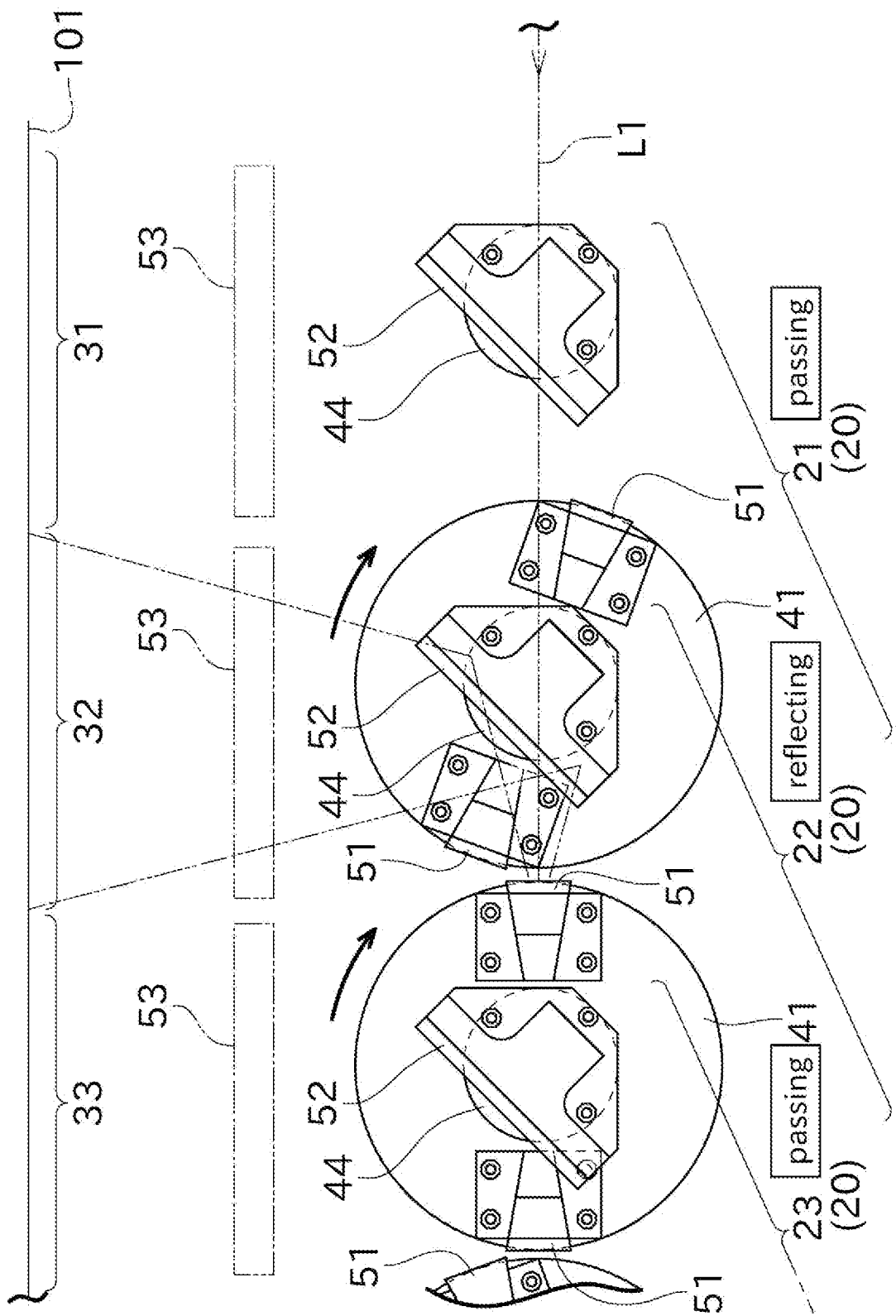
FIG. 6 is a view showing a state in which a second reflection unit reflects the light.

Next, each of the reflection units 20 will be described in detail with reference to FIGS. 3 to 6. FIG. 3 is a diagonal view showing a state in which one reflection unit 20 reflects the light. FIG. 4 is a diagonal view showing a state in which the reflection unit 20 passes through the light. FIG. 5 is a diagram showing a state in which the first reflection unit 21 of the plurality of the reflection units 20 reflects the light. FIG. 6 is a diagram showing a state in which the second reflection unit 22 reflects the light.

FIG. 3 shows only the first reflection unit 21 of the nine reflection units 20. Since all of the nine reflection units 20 have the same configuration, the first reflection unit 21 will be described below as representative.

As shown in FIG. 3, the first reflection unit 21 includes a turntable (rotating member) 41, a motor (drive source) 42, a first light guide member 51, a second light guide member 52, and a scanning lens 53.

The turntable 41 is a hollow disc-shaped member in the present embodiment and is rotatable about the rotational axis 20c. One end of a transmission shaft 43, which is formed in a hollow cylindrical shape, is fixed to the turntable 41. The transmission shaft 43 is rotatably supported by a housing not shown in the figure of the reflection unit 20.

The motor 42 is capable of rotating the turntable 41. By transmitting the driving force of the motor 42 to the transmission shaft 43, the turntable 41 rotates together with the transmission shaft 43. The motor 42 is an electric motor in this embodiment but is not limited thereto.

The first light guide member 51 is integrally provided with the turntable 41 so that it rotates around the rotational axis 20c. This rotational axis 20c is arranged to be orthogonal to the light path of the laser beam incident on the reflection unit 20. In the following, the light path of the laser beam incident on the reflection unit 20 may be referred to as the first light path L1. The reflection surface described below included by the first light guide member 51 can reflect the incident light by being hit by the incident light traveling along the first light path L1. The first light guide member 51 is fixed near the outer periphery of the turntable 41 using bolts or the like.

Two or more even numbers of the first light guide members 51 are provided for one turntable 41 (one reflection unit 20). The plurality of the first light guide members 51 are identical in shape to each other.

In the present embodiment, two first light guide members 51 are provided for one turntable 41. The two first light guide members 51 are respectively arranged to divide 360° equally in the turntable 41. Specifically, as shown in FIG. 3, one first light guide member 51 is disposed at a position 180° displaced with respect to the other first light guide member 51.

The first light guide member 51 is formed in a block shape by a metal such as aluminum.

The first light guide member 51 includes a first reflection surface 61 and a second reflection surface 62. Specifically, a cross-sectional V-shaped groove is formed in the first light guide member 51 to open the side far from the rotational axis 20c. The first reflection surface 61 and the second reflection surface 62 are formed on the inner wall of this groove.

The first reflection surface 61 and the second reflection surface 62 are both formed in a planar shape. The first reflection surface 61 is inclined with respect to a virtual plane perpendicular to the rotational axis 20c. The second reflection surface 62 is inclined with respect to the virtual plane perpendicular to the rotational axis 20c.

The first reflection surface 61 and the second reflection surface 62 are inclined with respect to the virtual plane perpendicular to the rotational axis 20c in opposite directions and at equal angles (specifically,) 45° to each other. Accordingly, the first reflection surface 61 and the second reflection surface 62 are arranged to form a V-shape.

In the present embodiment, the two first light guide members 51 are disposed at positions corresponding to mutually opposite sides of a regular polygon (specifically, a regular 18-sided polygon). Accordingly, the central angle corresponding to one of the first light guide members 51 is 20°. The first light guide member 51 is not disposed at a position corresponding to a side other than the above-described opposing sides.

When the two first light guide members 51 rotate together with the turntable 41, the state in which the first light guide members 51 is hit by the laser beam incident on the reflection unit 20 and traveling along the first light path L1 and the state in which the first light guide members 51 is not hit by the laser beam are alternately switched. As shown in FIG. 3, the state in which any of the two first light guide members 51 is hit by the incident light is the reflection state described above. As shown in FIG. 4, the state in which none of the two first light guide members 51 is hit by the incident light is the passing state described above.

Focusing on a single first light guide member 51, the first light guide member 51 crosses the light path of the incident light twice for each 360° rotation. As described above, in the first light guide member 51, reflection surfaces (specifically, the first reflection surface 61 and the second reflection surface 62) that reflect the incident light are formed only on the side far from the rotational axis 20c. In one of the two times, the reflection surface of the first light guide member 51 faces the upstream side of the traveling direction of the incident light, so that the light can be effectively reflected. On the other hand, in the remaining one time, the reflection surface of the first light guide member 51 faces the downstream side of the traveling direction of the incident light, so that even if light were to be hit by the first light guide member 51, the first light guide member 51 would not function effectively.

However, in the present embodiment, any first light guide member 51 is arranged to be paired with other first light guide member 51 whose phase is 180° different from each other. Accordingly, at timing when the first light guide member 51 crosses the light path in a direction that does not effectively reflect the incident light, the other first light guide member 51 always crosses the light path in a direction that effectively reflects the incident light. Accordingly, since the first light guide member 51 whose reflection surface does not face the incident light does not substantially interfere with the passage of the incident light, the light can be used efficiently as a whole.

The first light path L1 is perpendicular to the rotational axis 20c. The two first light guide members 51 are arranged with a phase difference of 180° with respect to each other. Accordingly, of the two first light guide members 51 placed across the rotational axis 20c, only the first light guide member 51 located on the side close to the upstream side of the first light path L1 is to be hit by the incident light.

The first reflection surface 61 is arranged to overlap with the first light path L1 when the first light guide member 51 is in a predetermined rotational phase. Accordingly, the incident light is reflected by the first reflection surface 61, and then reflected by the second reflection surface 62.

When viewed along the rotational axis 20c, the first reflection surface 61 and the second reflection surface 62 of the first light guide member 51 are directed orthogonal to the rotational axis 20c. As shown in FIG. 3, when the first light guide member 51 rotates with the incident light hits the first light guide member 51, the directions of the first reflection surface 61 and the second reflection surface 62 change continuously. Accordingly, the direction of the light emitted from the second reflection surface 62 smoothly changes in the direction shown by the black filled arrows in FIG. 3. Thus, a deflection of the emitted light is realized.

Since the first reflection surface 61 and the second reflection surface 62 are arranged in a V-shape, as the first light guide member 51 rotates, the emitted light is deflected along a plane perpendicular to the rotational axis 20c, as shown by the black filled arrows in FIG. 3. This plane is offset in the direction of the rotational axis 20c with respect to the first light path L1. This allows the light emitted from the first light guide member 51 to enter the second light guide member 52.

The laser beam is incident on the reflection unit 20 so as to be orthogonal to the rotational axis 20c. In the case where the rotational phase of the first light guide member 51 is perfectly matched with the direction of the incident light, when viewed along the rotational axis 20c, the first reflection surface 61 and the second reflection surface 62 are orthogonal to the incident light.

Accordingly, at this time, the laser beam is reflected twice so as to be folded back by the first light guide member 51, and is emitted in a direction parallel and opposite to the direction of the first light path L1, as shown by the second light path L2 in FIG. 3.

The second light guide member 52 reflects the light emitted from the first light guide member 51 and guides it to a scanning area (first scanning area 31) corresponding to the first reflection unit 21.

The second light guide member 52 is disposed at a position offset from the first light path L1 by an appropriate distance in the direction of the rotational axis 20c described above. The second light guide member 52 is fixed using a bolt or the like to an end portion on one side in the longitudinal direction of the fixed shaft 44 formed in an elongated shape. The fixed shaft 44 has an elongated recess 44a formed along the light path of the incident light. Accordingly, the laser beam from the laser generator 12 is not interrupted by the second light guide member 52 nor by the fixed shaft 44, but is led to the side of the first light guide member 51 through the recess 44a as a light passage path.

The second light guide member 52 is formed in a block shape by a metal such as aluminum. The second light guide member 52 includes a first light guide reflection surface 66 and a second light guide reflection surface 67. Specifically, a cross-sectional V-shaped groove is formed in the second light guide member 52 to open a side inclined at 45° to the direction of the first light path L1 when viewed along the rotational axis 20c. A first light guide reflection surface 66 and a second light guide reflection surface 67 are formed on the inner wall of this groove.

The first light guide reflection surface 66 and the second light guide reflection surface 67 are both formed in a planar shape. The first light guide reflection surface 66 is inclined with respect to a virtual plane perpendicular to the rotational axis 20c. The second light guide reflection surface 67 is inclined with respect to the virtual plane perpendicular to the rotational axis 20c.

The first light guide reflection surface 66 and the second light guide reflection surface 67 are inclined with respect to the virtual plane perpendicular to the rotational axis 20c in opposite directions and at equal angles (specifically,) 45° to each other. Accordingly, the first light guide reflection surface 66 and the second light guide reflection surface 67 are arranged to form a V-shape.

The first light guide reflection surface 66 and the second light guide reflection surface 67 of the second light guide member 52 are arranged to cover a light deflection range by the first light guide member 51. The first light guide reflection surface 66 is placed corresponding to the above-described plane including the deflection range of the emitted light by the first light guide member 51. Accordingly, the laser beam is reflected by the first light guide reflection surface 66, and then reflected by the second light guide reflection surface 67.

The scanning lens 53 is a free-form surface lens, for example, a known fθ lens can be used. The scanning lens 53 is disposed between the second light guide member 52 and the first scanning area 31. With this scanning lens 53, the focal distance can be made constant in the center and the peripheral portions of the scanning range.

Nine reflection units 20 configured as described above are lined up along the traveling direction of the incident light from the laser generator 12 to constitute the light guide device 13 shown in FIG. 2. In all of the reflection units 20, the rotational axes 20c of the first light guide members 51 are parallel to each other. In the nine reflection units 20, the first light guide members 51 rotate at an equal angular velocity and in the same direction as each other. The rotational phase of the first light guide member 51 differs among the plurality of the reflection units 20. This allows timing at which the first light guide member 51 is hit by the incident light to be different among the plurality of reflection units 20. In the present embodiment, the difference in the rotational phase of the first light guide member 51 between the two reflection units 20 increases by a certain angle (20° in the present embodiment) every time the reflection units 20 are separated by one. This allows the plurality of reflection units 20 to be switched to the reflecting state according to the order in which they are lined up.

The rotation of the first light guide member 51 linked by the plurality of reflection units 20 can be realized, for example, by controlling the motors 42 provided by the plurality of the reflection units 20 to rotate synchronously. However, for example, the interlocked rotation of the first light guide member 51 can also be realized by connecting the respective transmission shafts 43 to each other by gears or belts, and driving them by a common motor.

FIG. 5 shows a case in which only the first reflection unit 21 of the nine reflection units 20 enters the reflecting state. FIG. 6 shows a case in which, as a result of the rotation of the first light guide member 51 of each of the reflection units 20 from the state of FIG. 5, the first reflection unit 21 changes to a passing state and the second reflection unit 22 enters a reflecting state. In this way, the reflection units 20 that perform light scanning can be switched sequentially to realize light scanning along the long scanning line 101 as a whole.

In the reflection units 20 adjacent to each other, the transmission shaft 43 of the reflection unit 20 on the upstream side of the incident light is attached to the fixed shaft 44 of the reflection unit 20 on the downstream side. Accordingly, the first light guide member 51 of the upstream reflection unit 20 rotates around the second light guide member 52 of the downstream reflection unit 20. As described above, since the second light guide member 52 reflects light while offsetting it, light emitted from the second light guide member 52 is not interrupted by the rotating first light guide member 51. This arrangement makes it possible to downsize the light guide device 13 and to easily bring the scanning areas of the respective reflection units 20 into close proximity with each other.

As described above, the light guide device 13 of the present embodiment includes the plurality of the reflection units 20 that reflect incident light so as to guide the incident light to irradiate on the workpiece 100. The plurality of the reflection units 20 are lined up along the traveling direction of the incident light. Each of the plurality of the reflection units 20 includes the first light guide member 51 that reflects the incident light. Each of the plurality of the reflection units 20 is switched between the reflecting state in which the first light guide member 51 reflects the incident light by being hit by the incident light and a passing state in which the first light guide member 51 lets the incident light pass through without being hit by the incident light by rotating the first light guide member 51. Timing of being in the reflecting state differs among the plurality of reflection units 20. In the reflecting state, the reflected light due to the reflection of the incident light is deflected as the first light guide member 51 rotates. The reflected light is led to the irradiated point 102 included in the scanning area in which the reflection unit 20 scans the workpiece 100. The first scanning area 31 of the first reflection unit 21, the second scanning area 32 of the second reflection unit 22, ... are lined up in parallel with the traveling direction of the incident light.

As a result, by rotating the first light guide member 51 in each of the plurality of the reflection units 20, the reflection unit 20 that reflects the incident light can be mechanically changed to switch the scanning area to the workpiece 100. Accordingly, the switching of the scanning area can be performed with a simple configuration.

In the present embodiment, in the plurality of the reflection units 20, the first light guide members 51 rotate at equal angular velocity and in the same direction as each other. The difference in the rotational phase of the first light guide member 51 between the two reflection units 20 increases by a certain angle for every one the reflection unit 20 apart.

This allows synchronization of the regular switching of the reflection units 20 that reflect the incident light and the deflection of the light for scanning. In addition, the plurality of the scanning areas can be scanned according to the order in which they are arranged.

In the present embodiment, in the plurality of the reflection units 20, the rotational axes 20c of the first light guide members 51 are parallel to each other. In each of the plurality of the reflection units 20, the rotational axis 20c of the first light guide member 51 is orthogonal to the incident light.

This allows the incident light to pass through the reflection unit 20 that is in the passing state and reach the reflection unit 20 that is in a reflecting state.

In the present embodiment, in the reflecting state of the reflection unit 20, the first light guide member 51 reflects so as to deflect along the plane perpendicular to the rotational axis 20c of the first light guide member 51. This plane is offset in the direction of the rotational axis 20c with respect to the incident light to the reflection unit 20. Each of the plurality of the reflection units 20 includes a second light guide member 52. The second light guide member 52 reflects the reflected light reflected in the first light guide member 51 so as to guide to the scanning area.

As a result, by reflecting the light with the second light guide member 52, the flexibility of the position of the scanning area can be increased. In addition, by reflecting the light with the first light guide member 51 while offsetting the light, a layout in which the second light guide member 52 does not interrupt the incident light which is to be incident to the reflection unit 20 can be realized.

In the present embodiment, the first light guide member 51 includes the first reflection surface 61 and the second reflection surface 62. The first reflection surface 61 is formed in a planar shape that is inclined with respect to the plane perpendicular to the rotational axis 20c of the first light guide member 51. The second reflection surface 62 is formed in a planar shape inclined with respect to the plane perpendicular to the rotational axis 20c of the first light guide member 51. The direction in which the first reflection surface 61 is inclined relative to the plane perpendicular to the rotational axis 20c and the direction in which the second reflection surface 62 is inclined relative to the plane perpendicular to the rotational axis 20c are opposite. After the incident light is reflected by the first reflection surface 61, the incident light is reflected by the second reflection surface 62.

This allows for a simple configuration in which light is reflected while being offset by the first light guide member 51.

In the present embodiment, around the second light guide member 52 in each of all the reflection units 20 except the first reflection unit 21 among the plurality of the reflection units 20, the first light guide member 51 of the other reflection units 20 rotates.

This allows the distance between the reflection units 20 to be shortened and the light guide device 13 to be made more compact.

In this embodiment, the second light guide member 52 reflects the light which is reflected by the first light guide member 51 while offsetting the light in the direction of the rotational axis 20c of the first light guide member 51.

This allows the light reflected by the second light guide member 52 to not be interrupted by the first light guide member 51 rotating around the second light guide member 52.

In the present embodiment, the second light guide member 52 includes the first light guide reflection surface 66 and the second light guide reflection surface 67. The first light guide reflection surface 66 is formed in a planar shape inclined with respect to the plane perpendicular to the rotational axis 20c of the first light guide member 51. The second light guide reflection surface 67 is formed in a planar shape inclined with respect to the plane perpendicular to the rotational axis 20c of the first light guide member 51. The direction in which the first light guide reflection surface 66 is inclined relative to the plane perpendicular to the rotational axis 20c and the direction in which the second light guide reflection surface 67 is inclined relative to the plane perpendicular to the rotational axis 20c are opposite. After the light which is reflected by the first light guide member 51 is reflected by the first light guide reflection surface 66, the light is reflected by the second light guide reflection surface 67.

This allows for a simple configuration in which light is reflected while being offset by the second light guide member 52.

In the present embodiment, in each of the plurality of the reflection units 20, two or more even numbers of first light guide members 51 are arranged so as to divide 360° at equal angular intervals.

As a result, by rotating the plurality of the first light guide members 51, the reflection unit 20 can be switched to the reflecting state multiple times per one rotation. Since the plurality of the first light guide members 51 are all arranged in pairs across the rotational axis 20c, the incident light is not interrupted by the first light guide members 51 that are in a rotational phase other than the rotational phase in which the incident light is reflected for scanning.

In this embodiment, each of the plurality of the reflection units 20 includes the scanning lens 53. The scanning lens 53 is placed in the light path from the first light guide member 51 to the scanning area.

This allows the focal distance to be easily aligned in each scanning area.

The laser processing device 1 of this embodiment includes the light guide device 13. In each of the plurality of the reflection units 20, light emitted from the first light guide member 51 which rotates is led to any irradiated point 102 included in the straight scanning line 101. The light path length from an incident position of the light to the first light guide member 51 to the irradiated point 102 is substantially constant over all the irradiated points in the scanning line 101.

The scanning speed on the scanning line 101 of the light led from each of the plurality of the reflection units 20 is substantially constant.

This allows for good light scanning along the long scanning line 101.

Next, with reference to FIG. 7, a modification of the light guide device 13 will be described. In the description of this modification, members identical or similar to those of the aforementioned embodiment are given the same reference numerals in the drawings and descriptions thereof may be omitted.

Figure 7:
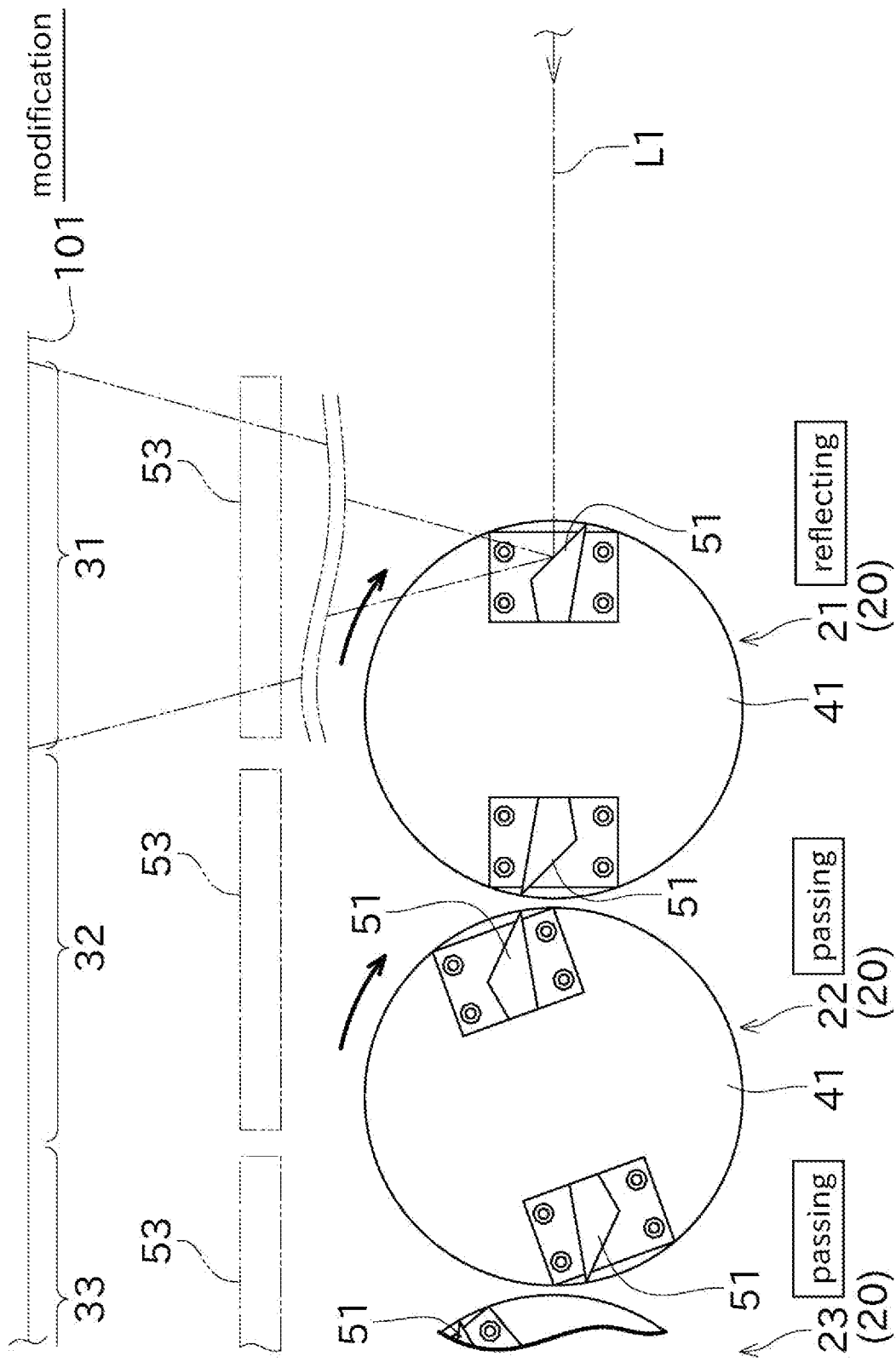
FIG. 7 is a modification of the reflection unit is shown.

In the modification shown in FIG. 7, when the rotational phase of the first light guide member 51 is exactly matched with the direction of the incident light, the reflection surface of the first light guide member 51 is arranged to be inclined at an angle of 45° to the incident light when viewed along the rotational axis 20c. Accordingly, in the reflection unit 20 of the modification, when viewed along the rotational axis 20c, the first light guide member 51 deflects the reflected light in an angular range centered on an orientation that is changed from the direction of the incident light by 90°.

In the modification of FIG. 7, the reflection surface of the first light guide member 51 is tilted, which causes some distortion in the light scanning, but the second light guide member 52 can be eliminated. Therefore, there is no need to form a V-shaped groove in the first light guide member 51 as in the above-described embodiment. In other words, the reflection surface that reflects the incident light in the first light guide member 51 can be formed in a plane parallel to the rotational axis 20c.

Although the preferred embodiment and the modifications of the present invention have been described above, the configurations described above can be modified, for example, as follows.

The number of reflection units 20 can be determined according to the shape of the irradiated object, such as its length. For example, three, four, or five units can be provided.

The plurality of the reflection units 20 may be somewhat separated from each other. A mirror or the like that changes the direction of the incident light may be disposed between the plurality of the reflection units 20.

Instead of scanning along one long straight scanning line 101 throughout the light guide device 13, the light guide device 13 may be configured to scan along a plurality of non-contiguous scanning lines 101. The plurality of the scanning lines 101 may be disposed apart in a longitudinal direction of the scanning lines 101, or may be disposed apart in a direction perpendicular to the longitudinal direction of the scanning lines 101. The plurality of the scanning lines 101 may be oriented differently from each other.

Figure 8:
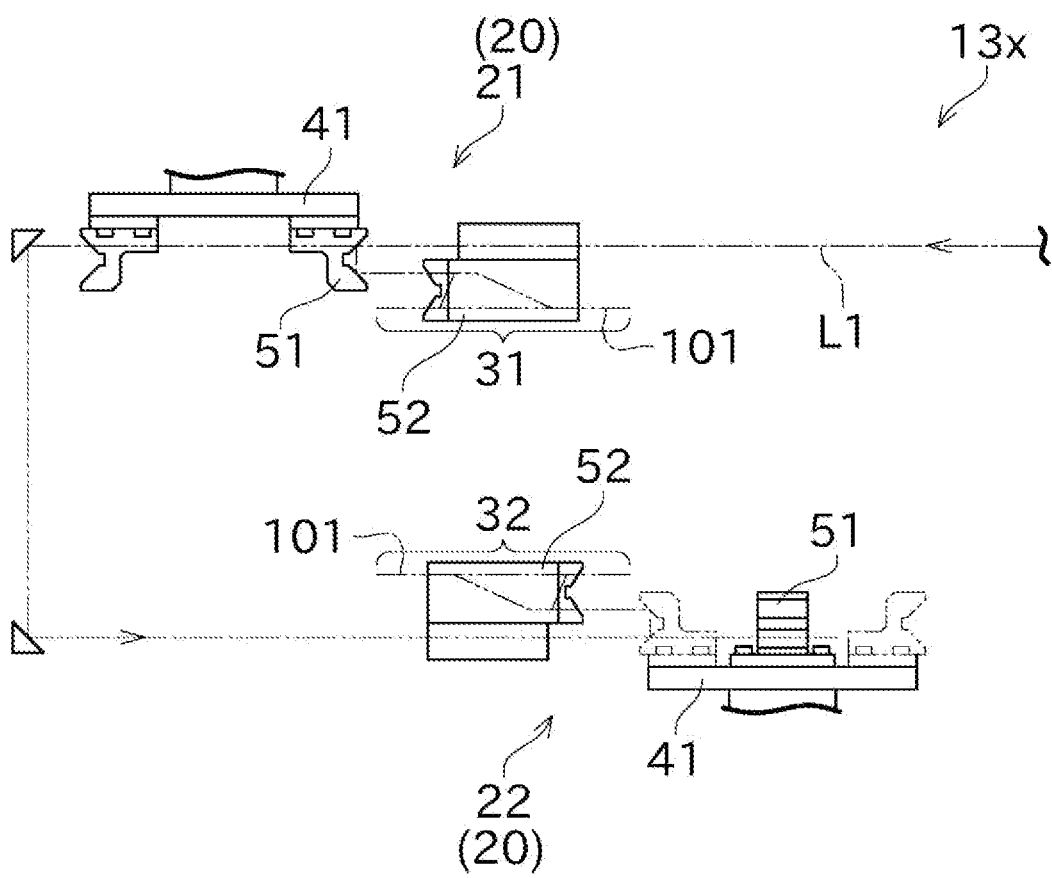
FIG. 8 is a modification of the light guide device.

In the light guide device 13x shown in FIG. 8, the two reflection units 20 perform scanning along two scanning lines 101 arranged in parallel with a suitable distance between them. FIG. 8 shows a view in a direction perpendicular to the processing surface of the workpiece 100. The number of scanning lines 101 may be three or more.

In the above embodiment, the number of the first light guide members 51 in each reflection unit 20 is two. This is not limited thereto and it may be four, six, or eight, for example.

The central angle corresponding to the first light guide member 51 can also be changed as appropriate. For example, the central angle can be changed so that the central angle is not 20° but a central angle (30°) corresponding to one side of a regular dodecagon.

In the above embodiment, around the second light guide member 52 of the reflection unit 20, the first light guide member 51 of the reflection unit 20 which is adjacent to the reflection unit 20 on the upstream side of the traveling direction of the incident light than the reflection unit 20 rotates. However, the second light guide member 52 may be disposed between the reflection unit 20 and the adjacent reflection unit 20 located downstream in the traveling direction of the incident light relative to the reflection unit 20.

The first reflection surface 61 and the second reflection surface 62 of the first light guide member 51 may be realized by a prism.

The first light guide reflection surface 66 and the second light guide reflection surface 67 of the second light guide member 52 may be realized by a prism.

The first light guide member 51 can be fixed to an arm-like rotating member, for example, instead of the turntable 41.

Instead of fixing the second light guide member 52 to a fixed shaft 44 that is inserted into the turntable 41 and the transmission shaft 43 of the adjacent reflection unit 20, the second light guide member 52 can be fixed to be suspended, for example, using a portal frame. In this case, it is not necessary to configure the turntable 41 and the transmission shaft 43 in a hollow form.

The optical scanning device to which the light guide device 13 is applied is not limited to the laser processing device 1, but may be, for example, an image forming device.

In view of the foregoing teachings, it is clear that the present invention may take many modified and variant forms. Accordingly, it is to be understood that the invention may be practiced in a manner other than that described herein within the scope of the appended claims.

DESCRIPTION OF THE REFERENCE NUMERALS 1 laser processing device (optical scanning device)
13 light guide device
20 reflection unit
20c rotational axis
51 first light guide member
52 second light guide member
53 scanning lens
61 first reflection surface
62 second reflection surface
66 first light guide reflection surface
67 second light guide reflection surface
100 workpiece (irradiated object)
101 scanning line
102 irradiated point

The invention claimed is:
1. A light guide device, comprising:
a plurality of reflection units reflecting incident light so as to guide the incident light to irradiate an object,
wherein the plurality of the reflection units are lined up along a traveling direction of the incident light,
wherein each of the plurality of the reflection units includes a first light guide member that reflects the incident light,
wherein each of the plurality of the reflection units is switched between a reflecting state in which the first light guide member reflects the incident light by being hit by the incident light and a passing state in which the first light guide member lets the incident light pass through without being hit by the incident light by rotating the first light guide member,
wherein timing of being in the reflecting state differs among the plurality of the reflection units,
wherein in the reflecting state, the reflected light due to reflection of the incident light is deflected as the first light guide member rotates, wherein the reflected light is led to an irradiated point included in a scanning area in which the reflection unit scans the object to be irradiated, and wherein the scanning areas of the plurality of the reflection units are lined up in parallel with the traveling direction of the incident light.

2. The light guide device according to claim 1, wherein in the plurality of the reflection units, the first light guide members rotate at equal angular velocity and in the same direction as each other and wherein a difference in rotational phase of the first light guide member between two the reflection units increases by a fixed angle for each one that separates the two.

3. The light guide device according to claim 1, wherein in the plurality of the reflection units, rotational axes of the first light guide members are parallel to each other and wherein in each of the plurality of the reflection units, the rotational axis of the first light guide member is orthogonal to the incident light.

4. The light guide device according to claim 1, wherein in the reflecting state, the first light guide member reflects the light so as to deflect the light along a plane perpendicular to a rotational axis of the first light guide member, wherein the plane is offset in a direction of the rotational axis with respect to the incident light, wherein each of the plurality of the reflection units includes a second light guide member, and wherein the second light guide member reflects the light reflected by the first light guide member so as to guide to the scanning area.

5. The light guide device according to claim 4, wherein the first light guide member comprises:

a first reflection surface formed in a planar shape inclined with respect to a plane perpendicular to the rotational axis of the first light guide member; and a second reflection surface formed in a planar shape inclined with respect to a plane perpendicular to the rotational axis of the first light guide member, wherein a direction in which the first reflection surface is inclined relative to the plane perpendicular to the rotational axis and a direction in which the second reflection surface is inclined relative to the plane perpendicular to the rotational axis are opposite, and wherein after the incident light is reflected by the first reflection surface, the incident light is reflected by the second reflection surface.

6. The light guide device according to claim 4, wherein around the second light guide member of at least one of the plurality of the reflection units, the first light guide member of the other reflection unit rotates.

7. The light guide device according to claim 6, wherein the second light guide member reflects the light which is reflected by the first light guide member while offsetting the light in the direction of the rotational axis of the first light guide member.

8. The light guide device according to claim 7, wherein the second light guide member comprises:

a first light guide reflection surface formed in a planar shape inclined with respect to a plane perpendicular to the rotational axis of the first light guide member; and a second light guide reflection surface formed in a planar shape inclined with respect to a plane perpendicular to the rotational axis of the first light guide member, wherein a direction in which the first light guide reflection surface is inclined relative to the plane perpendicular to the rotational axis and a direction in which the second light guide reflection surface is inclined relative to the plane perpendicular to the rotational axis are opposite, and wherein after the light which is reflected by the first light guide member is reflected by the first light guide reflection surface, the light is reflected by the second light guide reflection surface.

9. The light guide device according to claim 1, wherein in each of the plurality of the reflection units, at least two even numbers of the first light guide members are arranged in each of the plurality of reflection units so as to divide 360° at equal angular intervals.

10. The light guide device according to claim 1, wherein each of the plurality of the reflection units includes a scanning lens, and wherein the scanning lens is placed on a light path from the first light guide member to the scanning area.

11. An optical scanning device, comprising:

a light guide device including a plurality of reflection units reflecting incident light so as to guide the incident light to irradiate an object, wherein the plurality of the reflection units are lined up along a traveling direction of the incident light, wherein each of the plurality of the reflection units includes a first light guide member that reflects the incident light, wherein each of the plurality of the reflection units is switched between a reflecting state in which the first light guide member reflects the incident light by being hit by the incident light and a passing state in which the first light guide member lets the incident light pass through without being hit by the incident light by rotating the first light guide member, wherein timing of being in the reflecting state differs among the plurality of the reflection units, wherein in the reflecting state, the reflected light due to reflection of the incident light is deflected as the first light guide member rotates, wherein the reflected light is led to an irradiated point included in a scanning area in which the reflection unit scans the object to be irradiated, wherein the scanning areas of the plurality of the reflection units are lined up in parallel with the traveling direction of the incident light, wherein in each of the plurality of the reflection units, light emitted from the first light guide member which rotates is led to any irradiated point included in a straight scanning line, wherein a light path length from an incident position of the light to the first light guide member to the irradiated point is substantially constant over all the irradiated points in the scanning line, and wherein scanning speed on the scanning line of the light led from each of the plurality of the reflection units is substantially constant.

* * * * *